(12) United States Patent
Simon

(10) Patent No.: US 11,880,539 B1
(45) Date of Patent: Jan. 23, 2024

(54) POP-UP PREVIEW OF TABLE DATA

(71) Applicant: SAP SE, Walldorf (DE)

(72) Inventor: Patrick Simon, Beckingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/992,122

(22) Filed: Nov. 22, 2022

(51) Int. Cl.
| | |
|---|---|
| G06F 3/0481 | (2022.01) |
| G06F 16/22 | (2019.01) |
| G06F 40/18 | (2020.01) |
| G06F 16/26 | (2019.01) |

(52) U.S. Cl.
CPC .......... G06F 3/0481 (2013.01); G06F 16/221 (2019.01); G06F 16/2282 (2019.01); G06F 16/26 (2019.01); G06F 40/18 (2020.01); G06F 2203/04801 (2013.01); G06F 2203/04804 (2013.01)

(58) Field of Classification Search
CPC .. G06F 3/0481; G06F 16/221; G06F 16/2282; G06F 16/26; G06F 40/18; G06F 2203/04801; G06F 2203/04804
See application file for complete search history.

(56) References Cited

U.S. PATENT DOCUMENTS

| | | | | |
|---|---|---|---|---|
| 2005/0086586 A1* | 4/2005 | Kim | .................... | G06F 40/177 715/273 |
| 2006/0104276 A1* | 5/2006 | Naick | .................. | G06F 40/177 370/392 |
| 2011/0271185 A1* | 11/2011 | Chen | ....................... | G06F 9/453 715/708 |
| 2014/0157100 A1* | 6/2014 | Evans | ................... | G06F 40/177 715/227 |

OTHER PUBLICATIONS

Christina Niederer et al., TACO: Visualizing Changes in Tables Over Time, Dec. 4, 2017, IEEE Transactions On Visualization And Computer Graphics, vol. 24, No. 1, pp. 677-686 (Year: 2017).*
Jeremy Boy et al., Suggested Interactivity: Seeking Perceived Affordances for Information Visualization, Aug. 12, 2015, IEEE Transactions On Visualization and Computer Graphics, vol. 22, No. 1, pp. 639-648 (Year: 2015).*

* cited by examiner

Primary Examiner — Tam T Tran
(74) Attorney, Agent, or Firm — Buckley, Maschoff & Talwalkar LLC

(57) ABSTRACT

Provided are systems and methods directed to a pop-up visualization that provides a view of data values currently hidden on a display screen. In one example, the method may include displaying data values from a subset of columns of a database table via a user interface, displaying a plurality of pop-up indicators via the user interface, where each pop-up indicator is displayed within a different row of the displayed data values, detecting a selection of a pop-up indicator from among the plurality of pop-up indicators corresponding to a row of displayed data values, and in response to the detecting, initializing a display of a pop-up visualization which includes one or more additional data values from a second subset of columns of the database table that are not included in the row of displayed data values.

20 Claims, 12 Drawing Sheets

FIG. 2A

Items (10)   *Fast Preview* ⚙

| Last Name 211 | First Name 212 | Title 213 | Address 214 | Birth Date 215 | City 216 |
|---|---|---|---|---|---|
| Andrews | Katie | Ms. | 77 Stockholm Ln. | 4/29/1985 | 4/29/1985 |
| Corcoran | Randolph | Mr. | 11 Tweed Rd. | 5/23/1987 | 5/23/1987 |
| Deery | Samuel | Mr. | 99 Dell Rd., Apt. 14 | 4/19/1962 | 4/19/1962 |
| Franks | Clare | Mrs. | 8 Violet Ln. | 5/03/1958 | 5/03/1958 |
| Glenn | Sarah | Mrs. | 243 Ridge Rd. | 5/13/1995 | 5/13/1995 |
| Jameson | Logan | Mr. | 112 Nail Rd. | 4/27/1974 | 4/27/1974 |
| Motley | Peter | Mr. | 10 Route 33 Hwy | 3/30/1984 | 3/30/1984 |
| Petersen | James | Mr. | 55 Reed Rd. | 5/07/1979 | 5/07/1979 |
| Swan | Lindsey | Ms. | 90 Lake Drive | 4/16/1955 | 4/16/1955 |
| Williams | Samantha | Mrs. | 64 Flagler Road | 5/08/1969 | 5/08/1969 |

Items (10) — Fast Preview — 204

| Last Name | First Name | Title | Address | Birth Date | City |
|---|---|---|---|---|---|
| Andrews | Katie | Ms. | 77 Stockholm Ln. | 4/29/1985 | 4/29/1985 |
| Corcoran | Randolph | Mr. | 11 Tweed Rd. | 5/23/1987 | 5/23/1987 |
| Deery | Samuel | Mr. | 99 Dell Rd., Apt. 14 | 4/19/1962 | 4/19/1962 |
| Franks | Clare | Mrs. | 8 Violet Ln. | 5/03/1958 | 5/03/1958 |
| Glenn | Sarah | Mrs. | 243 Ridge Rd. | 5/13/1995 | 5/13/1995 |
| Jameson | Logan | Mr. | 112 Nall Rd. | 4/27/1974 | 4/27/1974 |
| Motley | Peter | Mr. | 10 Route 33 Hwy | 3/30/1984 | 3/30/1984 |
| Petersen | James | Mr. | 55 Reed Rd. | 5/07/1979 | 5/07/1979 |
| Swan | Lindsey | Ms. | 90 Lake Drive | 4/16/1955 | 4/16/1955 |
| Williams | Samantha | Mrs. | 64 Flagler Road | 5/08/1969 | 5/08/1969 |

Items (10) — 211

| Last Name | First Name | Title | Address | Birth Date | City | Email — 232 | ... |
|---|---|---|---|---|---|---|---|
| Andrews | Katie | Ms. | 77 Stockholm Ln. | 4/29/1985 | 4/29/1985 | | |
| Corcoran | Randolph | Mr. | 11 Tweed Rd. | 5/23/1987 | 5/23/1987 — 230 | | |
| Last Name | Birth Date | Country | Employee ID | Home Phone | | sglenn@email.com — 234 | |
| Glenn | May 13, 1995 | Canada | 111-328893021 | (604) 891-3329 | 5/13/1995 | 5/13/1995 | |
| 220b Logan | Sarah | Mrs. | 243 Ridge Rd. | 4/27/1974 | 4/27/1974 | | |
| Jameson | Peter | Mr. | 112 Nail Rd. | 3/30/1984 | 3/30/1984 | | |
| Motley | James | Mr. | 10 Route 33 Hwy | 5/07/1979 | 5/07/1979 | | |
| Petersen | Lindsey | Ms. | 55 Reed Rd. | 4/16/1955 | 4/16/1955 | | |
| Swan | Samantha | Mrs. | 90 Lake Drive | 5/08/1969 | 5/08/1969 | | |
| Williams | | | 64 Flagler Road | | ... | | |

*Fast Preview* — 202

Items (10)

| Last Name | First | Birth Date | City |
|---|---|---|---|
| Andrews | Katie | 4/29/1985 | 4/29/1985 |
| Corcoran | Rand | 5/23/1987 | 5/23/1987 |
| Deery | Sam | 4/19/1962 | 4/19/1962 |
| Franks | Clare | 5/03/1958 | 5/03/1958 |
| Glenn | Sara | 5/13/1995 | 5/13/1995 |
| Jameson | Loga | 4/27/1974 | 4/27/1974 |
| Motley | Pete | 3/30/1984 | 3/30/1984 |
| Petersen | Jame | 5/07/1979 | 5/07/1979 |
| Swan | Linds | 4/16/1955 | 4/16/1955 |
| Williams | Sama | 5/08/1969 | 5/08/1969 |

*Fast Preview* — 202

Fast Preview Settings 240

- Indicator Behavior: Mouse over | Mouse click
- Indicator Position: Left | Middle | Right
- Window Orientation: Row | Column — 241, 242
- Window Position: Flexible | Fix
- Columns in Window:
  - ☐ Last Name
  - ☐ First Name
  - ☐ Title
  - ☐ Address
  - ☑ Birth Date — 244
  - ☑ City
  - ☑ Country
  - ☑ Employee ID
  - ☑ Home Phone
  - ☑ Email
  - ☐ Postal Code
  - ☐ Region/State

| Items (10) | | | Address | Birth Date | City |
|---|---|---|---|---|---|
| Pop-Up Preview 230b | | | | | |
| Last Name | Glenn | | 77 Stockholm Ln. | 4/29/1985 | 4/29/1985 |
| Birth Date | May 13, 1995 | | 11 Tweed Rd. | 5/23/1987 | 5/23/1987 |
| Country | Canada | | 99 Dell Rd., Apt. 14 | 4/19/1962 | 4/19/1962 |
| Employee ID | 111-328893021 | | 8 Violet Ln. | 5/03/1958 | 5/03/1958 |
| Home Phone | (604) 891-3329 | | 243 Ridge Rd. | 5/13/1995 | 5/13/1995 |
| Email | sglenn@email.com | | 112 Nall Rd. | 4/27/1974 | 4/27/1974 |
| | Sarah | Mrs. | 10 Route 33 Hwy | 3/30/1984 | 3/30/1984 |
| 220b Logan | Peter | Mr. | 55 Reed Rd. | 5/07/1979 | 5/07/1979 |
| Glenn | | Mr. | 90 Lake Drive | 4/16/1955 | 4/16/1955 |
| Jameson | James | Ms. | 64 Flagler Road | 5/08/1969 | 5/08/1969 |
| Motley | Lindsey | Mrs. | | | |
| Petersen | Samantha | | | | |
| Swan | | | | | |
| Williams | | | | | |

Fast Preview

Items (10)

| Last Name | First | Birth Date | City |
|---|---|---|---|
| Andrews | Katie | 4/29/1985 | 4/29/1985 |
| Corcoran | Rand | 5/23/1987 | 5/23/1987 |
| Deery | Sam | 4/19/1962 | 4/19/1962 |
| Franks | Clare | 5/03/1958 | 5/03/1958 |
| Glenn | Sara | 5/13/1995 | 5/13/1995 |
| Jameson | Loga | 4/27/1974 | 4/27/1974 |
| Motley | Pete | 3/30/1984 | 3/30/1984 |
| Petersen | Jame | 5/07/1979 | 5/07/1979 |
| Swan | Linds | 4/16/1955 | 4/16/1955 |
| Williams | Sama | 5/08/1969 | 5/08/1969 |

*Fast Preview* — 202

Fast Preview Settings 240

- Indicator Behavior: [Mouse over] [Mouse click]
- Indicator Position: [Left] [Middle] [Right] — 246
- Window Orientation: [Row] [Column]
- Window Position: [Flexible] [Fix]
- Columns in Window:
  - ☑ Last Name
  - ☐ First Name
  - ☐ Title
  - ☐ Address
  - ☑ Birth Date
  - ☑ City
  - ☑ Country
  - ☑ Employee ID
  - ☑ Home Phone
  - ☑ Email
  - ☐ Postal Code
  - ☐ Region/State

Items (10)

*Fast Preview* — 202  ⚙ 204

| Last Name | First Name | Title | Address | Birth Date | City |
|---|---|---|---|---|---|
| Andrews | Katie | Ms. | 77 Stockholm Ln. | 4/29/1985 | 4/29/1985 |
| Corcoran | Randolph | Mr. | 11 Tweed Rd. | 5/23/1987 | 5/23/1987 |
| Deery | Samuel | Mr. | 99 Dell Rd., Apt. 14 | 4/19/1962 | 4/19/1962 |
| Franks | Clare | Mrs. | 8 Violet Ln. | 5/03/1958 | 5/03/1958 |
| Glenn | Sarah | Mrs. | 243 Ridge Rd. | 5/13/1995 | 5/13/1995 |
| Jameson | Logan | Mr. | 112 Nail Rd. | 4/27/1974 | 4/27/1974 |
| Motley | Peter | Mr. | 10 Route 33 Hwy | 3/30/1984 | 3/30/1984 |
| Petersen | James | Mr. | 55 Reed Rd. | 5/07/1979 | 5/07/1979 |
| Swan | Lindsey | Ms. | 90 Lake Drive | 4/16/1955 | 4/16/1955 |
| Williams | Samantha | Mrs. | 64 Flagler Road | 5/08/1969 | 5/08/1969 |

Items (3)

Fast Preview — 302

304 (gear icon)

300A

| Last Name | First Name | Title | Address | Birth Date | City |
|---|---|---|---|---|---|
| Corcoran — 320 | Terry | Ms. | 112 West Lane Rd. | 9/14/1995 | Vancouver |
| Email: *lcorcoran@company.com* <br> Title: Sales Representative | | | | | |
| Davison | Mary Ann | Mrs. | 12 Kings Ct., Apt #4 | 6/13/1968 | Phoenix |
| Email: *davison@company.com* <br> Title: Accountant | | | | | |
| Dolittle | Thomas | Mr. | 88 Commerce St. | 7/31/1988 | Seattle |
| Email: *tom.dolittle@company.com* <br> Title: Technician | | | | | |

Items (3)

[Fast Preview] — 302

304

| Last Name | First Name | Title | Address | Birth Date | City |
|---|---|---|---|---|---|
| Corcoran 320 | Terry | Ms. | 112 West Lane Rd. | 9/14/1995 | Vancouver |
| Email: t.corcoran@company.com  Title: Sales Representative | | | | | |
| Davison | Mary Ann | Mrs. | 12 Kings Ct., Apt #4 | 6/13/1968 | Heidelberg |
| Email: davison@company.com  Title: Accountant | | | | | |
| Dolittle | Thomas | Mr. | 88 Commerce St. | 7/31/1988 | Seattle |
| Email: tom.dolittle@company.com  Title: Technician | | | | | |

300B

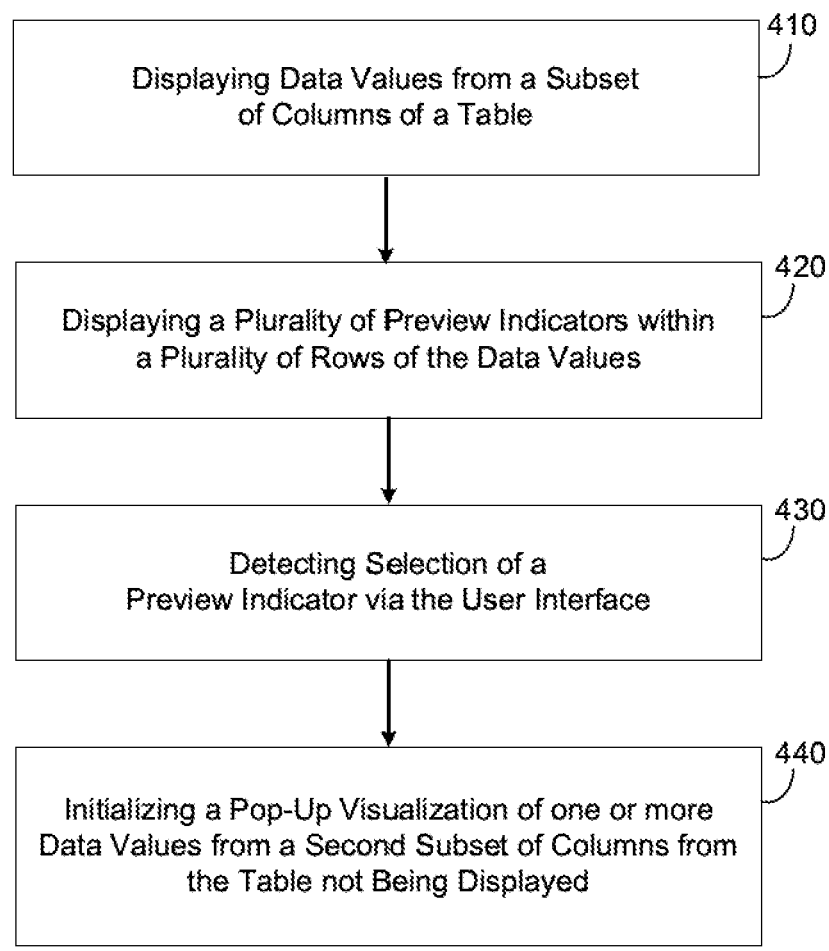

POP-UP PREVIEW OF TABLE DATA

BACKGROUND

A table is a collection of related data that is held in a tabular form that includes vertical columns and horizontal rows. Each row usually corresponds to a unique record and each column corresponds to a different field in that record. Visualizing the contents of table data may be critical for various industries including accounting, human resources, tax, and the like. Database tables often contain more columns and rows of data that are capable of fitting on a display screen of a computing device in a legible format. For this reason, the viewer (user) typically personalizes the user interface in a space-saving manner to ensure that only the most important columns of data are displayed. In some cases, a scroll bar is provided that enables the user to horizontally scroll through the data of the table that can't fit on the screen. But this process is rather cumbersome and requires moving all of the data on the screen.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIGS. 2A-2G are diagrams illustrating a process of displaying and managing a pop-up preview of table data in accordance with various example embodiments.

FIGS. 3A-3B are diagrams illustrating a process of modifying a height of a pop-up indicator in accordance with an example embodiment.

FIG. 4 is a diagram illustrating a method of displaying a pop-up preview of hidden data from a table in accordance with an example embodiment.

Figure 1:
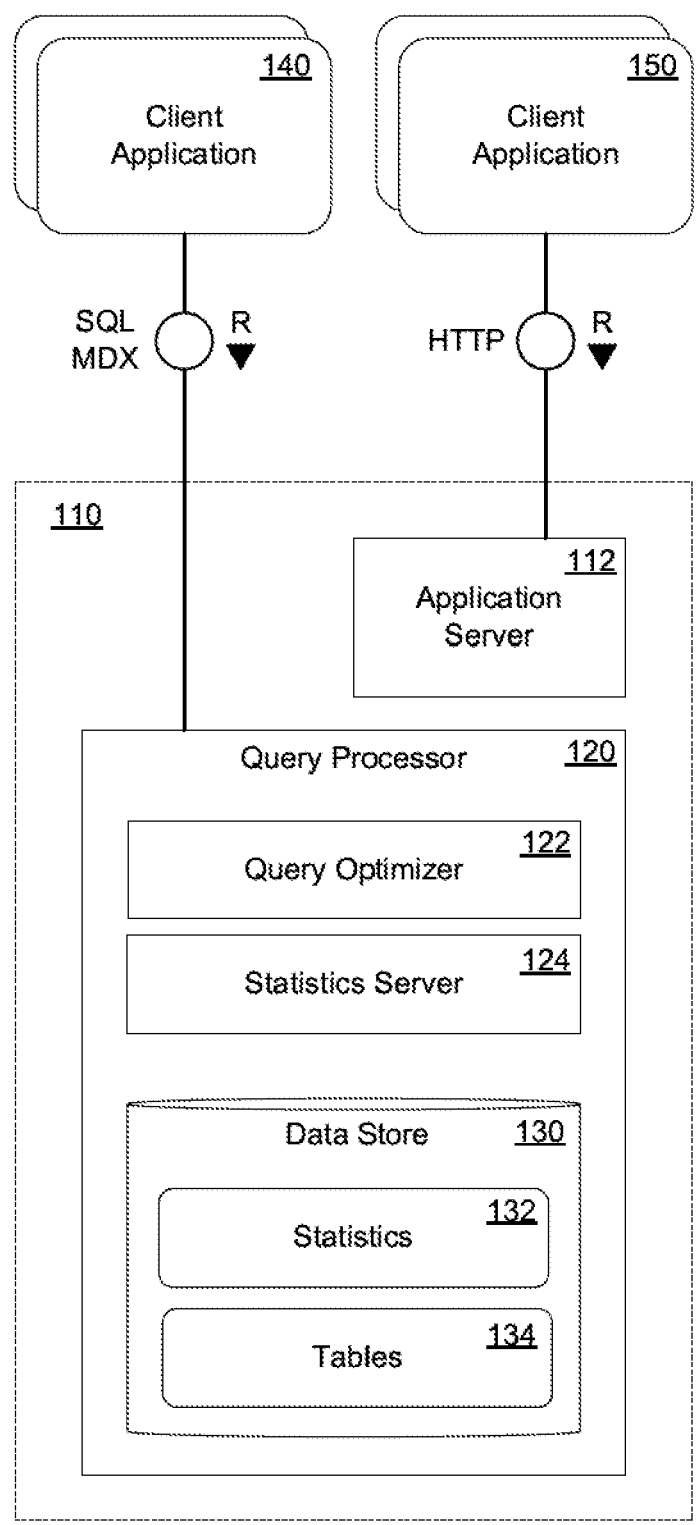
FIG. 1 is a diagram illustrating an example of a database system for accessing table data in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Tables are database objects that store data in a predefined format that often includes a plurality of rows arranged vertically and a plurality of columns arranged horizontally. The combination of rows and columns essentially creates a two-dimensional array of data values. When viewed as a whole, a database table can appear like a large block of numbers or other values which can be difficult to understand to a viewer. It can he even more difficult to view the table data when the user is on a device with a smaller viewing display screen such as a mobile phone, tablet, smart wearable device, or the like.

Software applications that provide views of table data from a database will often massage the data in such a way that makes it easier for a viewer to a comprehend. For example, blank space may be arranged in between rows and in between columns making the data values easier to visualize. The data values and the cells in which the data values are displayed may be enlarged. Also, the data values may be moved around and even cut off from the screen. However, by making the table data easier to view and understand, the software also reduces the amount of available space on the display screen for displaying the table data. As a result, much of the table data must remain hidden from a current view of the user interface. To access the hidden data, the user often is provided with a scroll bar or other mechanism to move the view of the screen in a direction to reveal the hidden data such as moving the view to the right.

The example embodiments overcome the drawbacks noted above through a dynamic pop-up notification which provides a preview of hidden table data (i.e., columns of data) without a need to scroll a field of view of the user interface. A database table may include a plurality of rows arranged vertically and a plurality of columns arranged horizontally which create an array of cells. Inside the cells are data values. As an example, the solution may be implemented within a host system, such as an enterprise resource planning software application. The system may include a user interface or other dashboard for visualizing table data. The table may include a plurality of columns and a plurality of rows but not all columns (and all rows) may be visible on the screen at once. When requested, the host system can provide a partial view of the table data in tabular format including one or more rows and one or more columns.

According to various embodiments, the host system may display a pop-up indicator in each row of the partially visible table within the user interface. Here, each row corresponds to a record within the database table, and the host system may display a pop-up indicator on each row corresponding to each record in the table. The user may move a mouse/cursor or otherwise select one of the pop-up indicators displayed within the user interface. In response to the selection, the host system may initialize a pop-up preview window with a preview of additional data of the row/record from columns of the table which are currently hidden and not being displayed on the user interface.

As an example, the pop-up preview window may be displayed directly above or below the row/record within the user interface and may include a row of additional data values from columns along with identifiers of the columns from the record/table. Accordingly, the host system may overcome limitations on screen size and provide hidden data arranged in a way that it is next to the data currently being displayed on the screen thereby relieving the user from having to scroll through the page in a horizontal or vertical direction.

The user may close the pop-up preview window associated with the record. If desired, the user may select another pop-up indicator of another row/record within the table. In response, the host system may display another pop-up preview window with additional data from hidden columns of the table including data values from the another row/record that are currently hidden on the screen. The host system may also provide a settings menu within controls for configuring settings of the pop-up preview window and the pop-up indicators that are displayed within the table on the user interface.

FIG. 1 illustrates an example of a database system 100 according to some embodiments. The database system 100 may access table data and display the table data via a user interface of client applications 140 and 150. It should be appreciated that a database architecture of the present application is not limited to the architecture shown in FIG. 1.

Referring to FIG. 1, the database system 100 may include a node 110 (e.g., a database node, a server node, a virtual machine, etc.) which may be part of a larger group of nodes. Generally, the node 110 may receive a query (e.g., SQL query, OQL query, XQuery, etc.) from any of the client applications 140 and 150 and return results thereto based on data stored within a data store 130 of the node 110. In this example, the node 110 may execute program code to provide an application server 112 and query processor 120. The application server 112 provides services for executing server applications. For example, Web applications executing on an application server may receive Hypertext Transfer Protocol (HTTP) requests from client applications 150 as shown in FIG. 1.

Query processor 120 may include the stored data and engines for processing the data. In this example, query processor 120 is responsible for processing Structured Query Language (SQL) and Multi-Dimensional eXpression (MDX) statements and may receive such statements directly from client applications 140.

Query processor 120 includes a query optimizer 122 for use in determining query execution plans and a statistics server 124 for determining statistics used to estimate query execution plan costs. The statistics server 124 may generate such statistics based on other stored statistics as described herein including histograms with distinct value sketches integrated therein. For example, in response to reception of a query consisting of a conjunct of several predicates on a stored table (or view) of the node 110 the statistics server 124 may estimate selectivity of the query based on known selectivities of various conjuncts of the query predicates.

In some embodiments, underlying database data capable of being queried may be stored in a data store 130 that includes tables 134 such as row-based data, column-based data, and object-based data. Here, the tables 134 may store database content that is accessible to the client applications 140 and 150 In addition, the data store 130 may include statistics 132 such as the histograms/histogram objects described herein which include the distinct value sketches integrated therein. Buckets within the histogram objects may be generated based on rows/columns of data from the tables 134. Furthermore, the data within the tables 134 may be indexed and/or selectively replicated in an index (not shown) to allow fast searching and retrieval thereof. The node 110 may support multi-tenancy to separately support multiple unrelated clients by providing multiple logical database systems which are programmatically isolated from one another.

In some embodiments, the node 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

According to various embodiments, when the query processor 120 receives a database query from one of the client applications 140 and 150, the query processor 120 may trigger the query optimizer 122 to generate a query execution plan for the database query. The query optimizer 122 may access one or more histograms (with distinct value sketches embedded therein) from the data store 130 (e.g., statistics 132) to identify statistics of the database associated with the data to be queried. This data can then be used by the query optimizer 122 to generate an accurate query execution plan for the database query. Here, the query optimizer 122 uses the statistics 132 including the histograms described herein to calculate costs of each query. The generated query execution plan can then be executed to carry out the database query on the tables 134 and return the results to the client applications 140 and 150.

The client applications 140 and 150 may include user interfaces that may employ the pop-up preview window that is described herein. For example, data that is queried from the tables 134 may be viewed in tabular format or spreadsheet format via a user interface of any of the client applications 140 and 150. The pop-up preview process that is described herein may be implemented within native user interface elements of the client applications 140 and 150. In some embodiments, the control overlay may be implemented within a library, code module, etc., that is made available to developers of the client applications 140 and 150.

In some cases, a table may contain more columns of data that can be visually displayed on the screen in a comprehensible manner to a viewer. In this case, a user can personalize the table so that preferred columns are displayed clearly and in a space-saving manner in the table. However, there may be situations in which the available space on the UI is then no longer sufficient to continue to display the table clearly and in a space-saving manner. In most cases, an unsightly horizontal scrollbar is then displayed and enables the user to scroll a field of view of the user interface in a horizontal direction to reveal the hidden table content from the columns of data not currently displayed on the screen. As another example, a line break may occur causing the row of data to be pushed together with other data already being displayed within the row causing a viewer confusion.

In the example embodiments, a pop-up preview window can provide a view of data that is currently hidden on the screen and without a need for a scroll bar. Instead, a user can simply mouseover or click on a row (or a visual indicator displayed within the row) causing a pop-up preview of hidden data from the row to be displayed on the screen. The hidden data that is not currently displayed in the row is from columns of the table that are not present on the screen due to size limitations of the screen. Accordingly, the pop-up preview can horizontally extend a view of the row which without having to scroll a field of field of the user interface in a horizontal manner. Instead, a pop-up window can be displayed right next to the row of data. (e.g., right above or right below) and overlapping on content already on the screen. Thus, the pop-up does not a different visual location such as a hidden column nor a scroll command to access the different visual location.

FIG. 2A illustrates a view of a user interface 200A that provides a visualization of table data from an underlying database table. As an example, the user interface 200A may be displayed via the client applications 140 and 150. In this example, the user interface 200A depicts six columns of data from the table including columns 211, 212, 213, 214, 215, and 216. Each of the columns 211, 212, 213, 214, 215 and 216 are intersected by a plurality of rows thereby creating a two-dimensional array of cells where each cell includes a data value. The data values may be of different formats such as numerical, string, binary, integer, float, and the like. In some embodiments, identifiers (e.g., names) of the columns may be read by the system from the database table and used to populate fields in the user interface 200A. For example, each column may include a header at a top of the column that identifies the column of data values displayed below. In the example of FIG. 2A, the column 211 includes the identifier "Last Name" which may be the name of the column in the underlying database table that can be read by the system and displayed at the top of the column 211 within the user interface 200A.

However, other columns may exist that are not presently displayed on the user interface 200A. These columns may be present in the underlying database table but due to limitations on screen size the user interface 200A hides these columns from being depicted on the user interface 200A for various reasons such as to save space and make the data easier to visualize and understand, and based on a view setting that is include in the user interface. For example, the determination on when and how to limit the amount of data being displayed may be based on settings configured by the user in the user interface, a number of pixels that are available on the display screen, a size of the data being displayed, a type of the data, and the like.

In the example of FIG. 2A, the user interface 200A also includes a fast preview button 202 and a settings button 204, according to various embodiments. The fast preview button 202 may be embedded within a template of the user interface and may include a button that is pressed by a cursor or a touch input. The fast preview button 202 is configured to be pressed by a user. When selected, the fast preview button 202 will display pop-up preview indicators on the rows of data. For example, as shown in FIG. 2B, a user has pressed the fast preview button 202 and the user interface 200A has changed to the user interface 200B shown in FIG. 2B.

Referring to FIG. 2B, the user interface 200B outputs pop-up indicators 220 within the rows of the table data within the viewing area of the user interface 200B. In some cases, the pop-up indicators 220 may include graphical overlays that are partially translucent enabling the underlying user interface content to be visible through the pop-up indicators 220. The pop-up indicators 220 may include color, shading, highlighting, bolding, italicizing, and any other special markers or markings that can differentiate the pop-up indicators 220 from the underlying tabular content visible in the user interface 200B.

In the example of FIG. 2B, the pop-up indicators 220 are initially displayed at a left-side of the screen on the user interface 200B. The pop-up indicators 220 are arranged in a vertical line similar to a column of values. However, in this case, it's a column of graphical overlays (pop-up indicators 220) that are overlaid on a column of values. As further described in some of the examples below, the position of the pop-up indicators 220 is configurable and can be moved to different positions within the user interface 200B such as the middle of the user interface 200B, a right side of the user interface 200B, and the like.

FIG. 2C illustrates a user interface 200C that occurs when the user presses on a pop-up indicator 220b shown in FIGS. 2B and 2C. According to various embodiments, in response to the user selecting the pop-up indicator 220b corresponding to a data record of 'Sarah Glenn', the user interface 200C may output a preview window 230 that includes additional data values 234 and identifiers 232 of the data values from the data record of 'Sarah Glenn' which are not currently visible on the screen. The additional data values 234 may include numbers, text, strings, integers, binary values, float values, and the like.

In the example of FIG. 2C, the additional data values 234 include values for birth date, country, employee ID, home phone number, and email address. The additional data values 234 may include values that are also already displayed on the user interface such as the last name of the user in this example. As further described in some of the examples herein, the user can configure which columns of data values from the data records are shown within the preview window 230 when one of the pop-up indicators 220 is selected. The preview window 230 includes additional data values from the selected row/record of 'Sarah Glenn' that are extracted from columns of data that are not currently visible on the user interface (i.e., hidden columns of data not able to fit on the screen). In this case, the window 230 is a row of data that is overlaid on top of another row within the user interface thereby making room for the window 230 without a need for additional screen space or scrolling of the user interface.

The location of the preview window 230 is configurable. In the example of FIG. 2C, the preview window 230 is formatted as a row of data just as the row of data within the user interface 200C. In addition, the preview window 230 may be displayed right above the row of data within the user interface and in a parallel with the row of data. As another example, the preview window 230 may be displayed on top of (in place of the row of data), just below the row of data, or the like. The preview window 230 may be activated by the user using a pointer or cursor to click on the pop-up indicator 220b. As another example, the preview window 230 may be activated by the user moving their cursor over the pop-up indicator 220b on the screen. The preview window 230 may not be transparent and may block out the underlying content from the table data that is currently displayed on the screen. In other words, the preview window 230 may be overlaid on the content currently visible on the screen thereby blocking it.

FIG. 2D illustrates a user interface 200D for configuring the preview window 230 shown in FIG. 2C and the pop-up indicators 220 shown in FIG. 2B. For example, when a user presses or otherwise selects a settings button 204 within the user interface 200D, the user interface 200D outputs a settings window 240 with controls for managing the preview window 230 and the pop-up indicators 220. For example, the settings window 240 may include a menu of controls for controlling how the preview window 230 is activated/ initialized such as by a mouse click or a mouse over. As another example, the settings window 240 may include a menu of controls for moving a position of the pop-up indicators 220 on the screen when they are activated such as a left side, a middle, and a right side of the screen. As another example, the settings window 240 may include controls for changing an orientation of the fields of data that are displayed within the preview window 230. As another example, the settings window 240 may include controls for controlling whether the preview window is movable by the user.

As another example, the settings window 240 may include a list of column names 244 and a list of checkboxes 243 or other selection means arranged for each of the column names 244 which enables the user to select which columns of data from the underlying database table are to be included in the preview window 230. As an example, the host system may read the column names from the underlying database table and display them within predefined content locations within the settings window 240. Thus, the user can decide which columns of data should be displayed in the preview window 230 and which columns should not. The currently selected controls may be highlighted or otherwise modified in color, shape, size, shading, highlighting, or the like, to indicate which controls are currently selected. The settings window 240 may initially choose default settings/selections for each of the controls. The default selections may be configurable.

FIG. 2E illustrates a user interface 200E in which a preview window 230b is depicted in an alternative orientation. In this example, the column names/identifiers 232 are vertically arranged within the preview window 230b and so are the additional data values 234. This change can be performed in response to the user selecting a control button 242 shown within the settings window 240 in FIG. 2D instead of the currently selected control button 241. Furthermore, a size or a height of the preview window 230b may smaller within the vertical orientation shown in FIG. 2E in comparison to a horizontal orientation.

FIG. 2F illustrates a user interface 200F which includes another example of the settings window 240. In this example, the settings window 240 depicts a currently selected button 245 of the pop-up indicator position control setting with a bold line. The user may change a position of the pop-up indicators 220 within the user interface when they are activated by selecting the button 246 which controls the pop-up indicators 220 to be visible on the right side of the screen. Thus, when the user returns to the fast preview interface, the pop-up indicators 220 will be moved to a right side of the user interface as shown in the user interface 200G in FIG. 2G.

Furthermore, although not shown in the examples of FIGS. 2A-2G, the user may also configure which columns of data are included in the preview window 230 using the controls for table names which include checkboxes. It should also be appreciated that other controls may be used such as radio buttons, or the like. The user may deselect a currently selected column name within the settings window 240 causing the data from that column to be removed from the preview window 230. The user may also newly select an unselected column name within the settings window causing the data from that column to now appear in the preview window when it is subsequently displayed.

FIGS. 3A-3B illustrate a process of modifying a height of a pop-up indicator in accordance with an example embodiment. Referring to FIG. 3A, a user interface 300A is illustrated which includes three rows of table data that are visible therein. Each row corresponds to a single data record from an underlying table of data. Here, the content within the rows have expanded to include multiple lines on the user interface. This can result from various factors including the user entering additional data via the user interface, a limited screen size, a setting on the user interface, or the like.

In particular, a row 310 of data depicted in the user interface includes data for a user named Terry Corcoran. The height of the row now includes multiple lines of data rather than a single line of data as in the examples of FIGS. 2A-2G. The user interface 300A may display a pop-up indicator 320 within the row 310 of data. Here, the pop-up indicator 320 may be displayed at a default display location within the row which corresponds to an upper left corner in the example of FIG. 3A. The user may configure this location of the pop-up indicator by pressing on a control button. For example, the user may press the fast preview button 302 (corresponding to the fast preview button 202 in FIG. 2A) next to a settings button 304. In response, as shown in FIG. 3B, the user interface 300A may be modified into the user interface 300B. Here, the pop-up indicator 320 has been moved from its default display location to a normalized display location within a middle/center height of the row.

FIG. 4 illustrates a method 400 of implementing a control overlay for a user interface element in accordance with an example embodiment. As an example, the method 400 may be performed by a web server, a cloud platform, an on-premises server, a database node included within a distributed database system, a user device, and the like. Referring to FIG. 4, in 410, the method may include displaying data values from a subset of columns of a table via a user interface. For example, a part of the table itself may be displayed or the content from the table may be visualized in tabular manner.

In 420, the method may include displaying a plurality of pop-up indicators within a plurality of rows of the data values, respectively, via the user interface. In 430, the method may include detecting a selection of a pop-up indicator from among the plurality of pop-up indicators within a row from among the plurality of rows of the data values. In 440, in response to the detecting, the method may include initializing a display of a pop-up visualization which includes one or more data values from a second subset of columns of the database table that are not included in the subset of columns currently displayed via the user interface.

In some embodiments, the plurality of pop-up indicators may include a plurality of graphical overlays that are partially transparent and which are overlaid on and allow visualization of the data values. In some embodiments, the displaying the plurality of pop-up indicators comprises displaying the plurality of pop-up indicators within the plurality of rows of data values, respectively, on the user interface. In some embodiments, the detecting may include detecting a cursor hovering over the pop-up indicator corresponding to the row. In some embodiments, the method may further include detecting a selection of a preview button via the user interface, and in response, initializing a display of the plurality of pop-up indicators corresponding to the plurality of rows of data values via the user interface.

In some embodiments, the method may further include detecting selection of a settings button via the user interface, and in response, displaying a settings menu with controls for configuring for the pop-up visualization and the plurality of pop-up indicators. In some embodiments, the method may further include modifying a horizontal arrangement of the one or more data values from the second subset of columns of the database table within the pop-up visualization into a vertical arrangement based on a selection of a control detected on the settings menu. In some embodiments, the method may further include moving the plurality of preview markers to a different side of the user interface based on a selection of a control detected on the settings menu.

Figure 5:
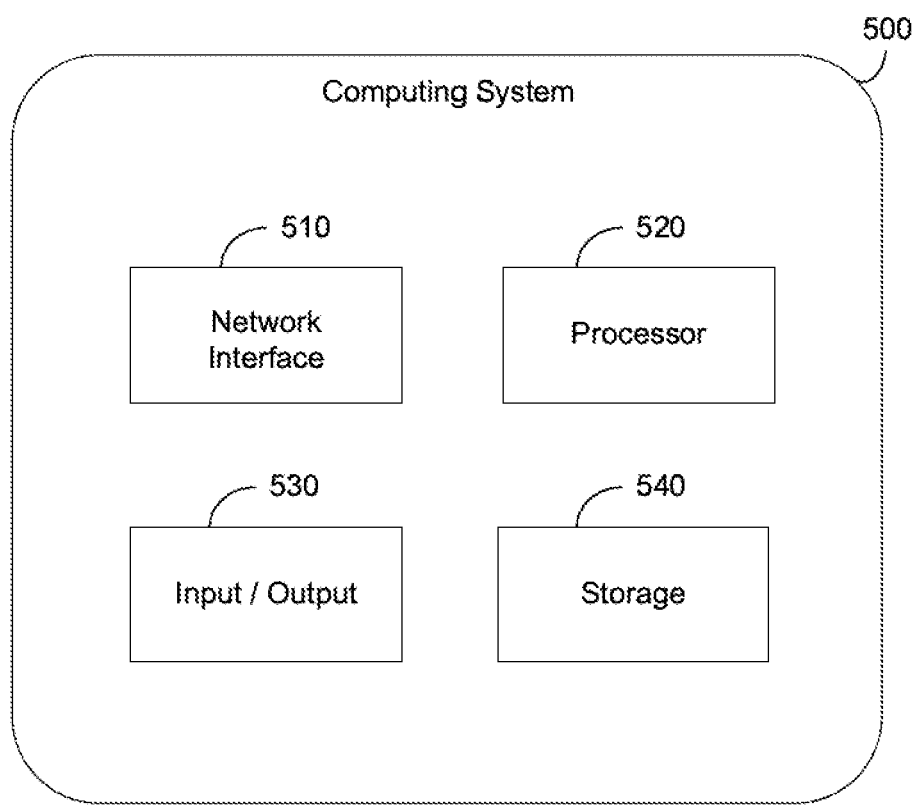
FIG. 5 is a diagram illustrating a computing system for use in the embodiments that are described herein.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. In some embodiments, the storage 540 may include a data store having a plurality of tables, database tables, records, partitions and sub-partitions. The storage 540 may be used to store database records, documents, entries, and the like.

In some embodiments, the processor 520 may display a plurality of rows of data values from a subset of columns of a database table via a user interface. The processor 520 may display a plurality of pop-up indicators corresponding to the plurality of rows of data values via the user interface. The processor 520 may detect a selection of a pop-up indicator from among the plurality of pop-up indicators corresponding to a row from among the plurality of rows of data values. In response to the detecting, the processor 520 may initialize a display of a pop-up visualization which includes one or more data values from a second subset of columns of the database table that are not included in the subset of columns currently displayed via the user interface.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store database tables; and
a processor configured to
  display a plurality of rows of data values from a subset of columns of a database table via a user interface,
  display a plurality of pop-up indicators corresponding to the plurality of rows of data values within a column among the subset of columns on the user interface,
  detect a selection of a pop-up indicator from among the plurality of pop-up indicators within the column corresponding to a row from among the plurality of rows of data values, and
  in response, overlay a display of a pop-up visualization on a different row of data values in the user interface, wherein the pop-up visualization includes one or more data values from a second subset of columns of the database table that are not included in the subset of columns currently displayed via the user interface.

2. The computing system of claim 1, wherein the plurality of pop-up indicators comprises a plurality of graphical overlays that are partially transparent and which are overlaid on and allow visualization of data values within the column.

3. The computing system of claim 1, wherein the processor is configured to display the plurality of pop-up indicators around a plurality of data values within the plurality of respective rows of the column on the user interface.

4. The computing system of claim 3, wherein the processor is configured to detect a cursor hovering over the pop-up indicator corresponding to the row.

5. The computing system of claim 1, wherein the processor is further configured to detect a selection of a preview button via the user interface, and in response, initialize a display of the plurality of pop-up indicators within the column on the user interface.

6. The computing system of claim 1, wherein the processor is further configured to detect selection of a settings button via the user interface, and in response, display a settings menu with controls for configuring for the pop-up visualization and the plurality of pop-up indicator markers.

7. The computing system of claim 6, wherein the processor is configured to modify a horizontal arrangement of the one or more data values from the second subset of columns of the database table within the pop-up visualization into a vertical arrangement based on a selection of a control detected on the settings menu.

8. The computing system of claim 6, wherein the processor is configured to move the plurality of pop-up indicators to a different side of the user interface based on a selection of a control detected on the settings menu.

9. A method comprising:
displaying data values from a subset of columns of a table via a user interface;
displaying a plurality of pop-up indicators within a plurality of respective rows of data values of a column among the subset of columns on the user interface;
detecting a selection of a pop-up indicator from among the plurality of pop-up indicators within a row from among the plurality of rows of the column on the user interface; and
in response to the detecting, overlaying a display of a pop-up visualization on a different row of data values in the user interface, wherein the pop-up visualization includes one or more data values from a second subset of columns of the database table that are not included in the subset of columns currently displayed via the user interface.

10. The method of claim 9, wherein the plurality of pop-up indicators comprises a plurality of graphical overlays that are partially transparent and which are overlaid on and allow visualization of data values within the column.

11. The method of claim 9, wherein the displaying the plurality of pop-up indicators comprises displaying the plurality of pop-up indicators around a plurality of data values within the plurality of respective rows of the column on the user interface.

12. The method of claim 11, wherein the detecting comprises detecting a cursor hovering over the pop-up indicator corresponding to the row.

13. The method of claim 9, wherein the method further comprises detecting a selection of a preview button via the user interface, and in response, initializing a display of the plurality of pop-up indicators within the plurality of respective rows of the column on the user interface.

14. The method of claim 9, wherein the method further comprises detecting selection of a settings button via the user interface, and in response, displaying a settings menu with controls for configuring for the pop-up visualization and the plurality of pop-up indicators.

15. The method of claim 14, wherein the method further comprises modifying a horizontal arrangement of the one or more data values from the second subset of columns of the database table within the pop-up visualization into a vertical arrangement based on a selection of a control detected on the settings menu.

16. The method of claim 14, wherein the method further comprises moving the plurality of preview markers to a different side of the user interface based on a selection of a control detected on the settings menu.

17. A non-transitory computer-readable medium comprising instructions which when executed by a processor cause a computer to perform a method comprising:
displaying data values from a subset of columns of a database table via a user interface;
displaying a plurality of pop-up indicators within a column from among the subset of columns displayed on the user interface, where each pop-up indicator is displayed within a different row of the column;
detecting a selection of a pop-up indicator from among the plurality of pop-up indicators corresponding to a row within the column; and
in response to the detecting, overlaying a display of a pop-up visualization on a different row of data values in the user interface, wherein the pop-up visualization includes one or more additional data values from a second subset of columns of the database table that are not included in the row of displayed data values.

18. The non-transitory computer-readable medium of claim 17, wherein the plurality of pop-up indicators comprises a plurality of graphical overlays that are partially transparent and which are overlaid on and allow visualization of data values within the column.

19. The non-transitory computer-readable medium of claim 17, wherein the method further comprises detecting a selection of a preview button via the user interface, and in response, initializing a display of the plurality of pop-up indicators within the plurality of respective rows of the column on the user interface.

20. The non-transitory computer-readable medium of claim 17, wherein the method further comprises detecting selection of a settings button via the user interface, and in response, displaying a settings menu with controls for configuring for the pop-up visualization and the plurality of pop-up indicators.

* * * * *